(12) United States Patent
Taherian et al.

(10) Patent No.: US 7,660,671 B2
(45) Date of Patent: Feb. 9, 2010

(54) METHOD AND APPARATUS FOR ELECTROMAGNETIC LOGGING OF A FORMATION

(75) Inventors: Reza Taherian, Sugar Land, TX (US); Tarek M. Habashy, Burlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 50 days.

(21) Appl. No.: 11/951,414

(22) Filed: Dec. 6, 2007

(65) Prior Publication Data

US 2009/0150076 A1    Jun. 11, 2009

(51) Int. Cl.
*G06F 15/00* (2006.01)

(52) U.S. Cl. ............ 702/6; 702/7; 702/9; 702/11; 324/338; 324/341; 324/347; 343/793; 343/853

(58) Field of Classification Search .......... 702/6, 702/7, 9, 11; 324/338, 341, 347; 343/793, 343/853
See application file for complete search history.

(56) References Cited

U.S. PATENT DOCUMENTS

| | | | |
|---|---|---|---|
| 3,944,910 A | 3/1976 | Rau | |
| 4,218,685 A | 8/1980 | Frosch et al. | |
| 4,698,572 A | 10/1987 | Stone | |
| 4,704,581 A | 11/1987 | Clark | |
| 4,710,775 A | 12/1987 | Coe | |
| 5,168,234 A * | 12/1992 | Freedman | 324/338 |
| 5,210,495 A | 5/1993 | Habashy et al. | |
| 5,345,179 A * | 9/1994 | Habashy et al. | 324/338 |
| 5,406,206 A | 4/1995 | Safinya et al. | |
| 5,999,884 A | 12/1999 | Kreigshauser et al. | |
| 2006/0145700 A1 | 7/2006 | Tabanou et al. | |

\* cited by examiner

*Primary Examiner*—Drew A Dunn
*Assistant Examiner*—Hien X Vo
(74) *Attorney, Agent, or Firm*—Darla Fonseca; Brigitte L. Echols

(57) ABSTRACT

Using an electromagnetic logging tool, desired antenna responses are synthesized from a combination of measured antenna responses, as well as antenna arrays particularly suited to provide the measurements. Those arrays may include cross dipole and double cross dipole antennas. Direct and derivative responses are used to synthesize the desired response, and the synthesized desired response is used to determine formation properties.

21 Claims, 16 Drawing Sheets

METHOD AND APPARATUS FOR ELECTROMAGNETIC LOGGING OF A FORMATION

BACKGROUND

1. Technical Field

This disclosure generally relates to electromagnetic methods and tools for well logging, and more particularly to improved antennas and methods for synthesizing antenna response.

2. Description of the Related Art

The measurement of dielectric constant (or dielectric permittivity) of formations surrounding a borehole is known to provide very useful information about the formations. The dielectric constant of the different materials of earth formations vary widely (for example, 2.2 for oil, 7.5 limestone, and 80 for water), so measurement of dielectric properties is a useful means of formation evaluation. For example, if the lithology and the water saturation of a particular formation are known, then the porosity may be determined if the dielectric constant of the formation could be obtained. Similarly, if the lithology and porosity are known, information as to the degree of water saturation can be obtained by measuring the dielectric constant of the formation.

A logging device that improved the art of measuring formation dielectric constant was the electromagnetic propagation tool as disclosed, for example, in the U.S. Pat. No. 3,944,910 ("the '910 patent") issued to Rau and assigned to the present assignee. This patent discloses a logging device including a transmitter and spaced apart receivers mounted in a pad that is urged against the borehole wall. Microwave electromagnetic energy is transmitted into the formations, and energy which has propagated through the formations is received at the receiving antennas. The phase shift and attenuation of the energy propagating in the formations are determined from the received signals. The dielectric constant and, if desired, the conductivity of the formations can then be derived from the phase shift and attenuation measurements.

The configuration of antennas is an important aspect of successful operation of electromagnetic propagation logging tools. At a relatively high frequency of operation (for example, 1100 MHz), the signal attenuates quite rapidly. Therefore, it is important to have transmitting antennas that can efficiently transmit energy into the formations, and to have receiving antennas that can efficiently receive energy that has propagated through the formations. Because the accuracy of the dielectric constant and conductivity measurements depends upon accurate measurements of attenuation and phase shift of the received signals, it is essential that the antennas operate in a stable manner over time and that the antennas are, and remain, in a substantially balanced condition.

In the '910 patent, the antennas in the electromagnetic propagation logging device are cavity-backed or slot antennas, that are filled with a dielectric material and include a probe that is an extension of the center conductor of a coaxial cable. The center conductor of the coaxial cable, also known as the "probe", extends across the slot and connects to the wall on the opposite side of the slot. The probe of the antenna, as disclosed in the '910 patent, extends in a direction parallel to the longitudinal direction of the borehole. This configuration is known as a "broadside" array. U.S. Pat. No. 4,704,581 ("the '581 patent"), issued to Clark and assigned to the present assignee, discloses a similar logging device, but wherein the antennas have probes that extend in a direction perpendicular to the longitudinal direction of the borehole. This configuration is known as an "endfire" array. The endfire array exhibits a deeper depth of investigation and is less affected by tool standoff (e.g., from mudcake) than the broadside array. On the other hand, the broadside array exhibits a stronger signal than the endfire array and may be preferred in relatively lossy (low resistivity) logging environments.

An example of a logging device based on the teachings of the '910 and '581 patents is an electromagnetic propagation tool sold under the trade name of EPT™ by Schlumberger Technology Corp. (Houston, Tex.). A similar tool, called adaptable EPT™ ("ADEPT™"), can provide either broadside operation or endfire operation during a given run, depending on the antenna selection. The ADEPT™ logging tool has two changeable antenna sets, one a broadside antenna array and the other an endfire antenna array. The EPT™ or ADEPT™ tools use cavity-backed antenna (or slot antenna) arrays. Other related tools based on similar arrays include U.S. Pat. No. 4,698,572 ("the '572 patent") issued to Clark. The '572 patent discloses electromagnetic logging tools incorporating slot antennas that have improved properties as compared with the conventional cavity-backed antennas. The slot antennas disclosed in this patent include tuning elements to improve their operation.

Furthermore, U.S. Pat. No. 5,434,507 ("the '507 patent") issued to Beren et al. discloses electromagnetic logging tools with two-dimensional antenna arrays. The antenna arrays may comprise slot antennas having two conductors arranged in a crossed configuration. Such an antenna is known as a cross dipole antenna. The two-dimensional array of antennas makes it possible to image the formations surrounding the borehole.

More recently, printed circuit antennas have been disclosed in U.S. Patent Application Publication No. 2006/0145700 ("the '700 application") in the name of Tabanou and assigned to the present assignee. These antennas may include printed circuit loops formed on an insulating layer. The loops may be configured to simulate the current paths of the conventional slot antennas noted above. The antenna has a reduced profile and more flexible structure, making it less prone to break under stress and therefore particularly useful in relatively harsh logging-while-drilling (LWD) applications.

While the above described antennas have been very reliable for obtaining electromagnetic logging information, the accuracy of that information has been limited by the mixed mode response generated by conventional antennas. Different antenna designs have different radiation characteristics that may be beneficial or detrimental to certain formation measurements. In dielectric and resistivity logging, for example, it is desirable to have high vertical resolution and low sensitivity to the standoff layer (i.e., mudcake) present between the antenna array and the formation. An antenna having a purely transverse electric (TE) radiation pattern would be ideal for standoff immunity, while an antenna having a purely transverse magnetic (TM) radiation pattern would be ideal for improved vertical resolution. Currently, however, there is no practical antenna design for downhole application that achieves pure TE or pure TM modes. An endfire array has mostly, but not completely, TE response while a broadside array has mostly, but not completely, TM response. In general, any antenna response can be decomposed into a mixture of TE and TM responses.

Accordingly, it is desirable to have a method of synthesizing pure TE and TM responses from the non-ideal, mixed response of existing antennas, and to have antenna arrays particularly adapted to provide the responses used in such synthesis.

SUMMARY OF THE DISCLOSURE

The present invention pertains to a method to determine a formation property using a synthesized response of a desired antenna array, comprising providing a first antenna array and a second antenna array; transmitting a first signal from a first antenna array transmitter; receiving the first signal at two or more first antenna array receivers; combining the received signals from the first antenna array receivers to produce a first antenna array direct response at a desired point and a first antenna array derivative response at the desired point; transmitting a second signal from a second antenna array transmitter; receiving the second signal at two or more second antenna array receivers; combining the received signals from the second antenna array receivers to produce a second antenna array direct response at the desired point and a second antenna array derivative response at the desired point; synthesizing a response of the desired antenna array at the desired point using the direct responses and derivative responses of the first and second antenna arrays; and determining the formation property using the synthesized response.

The present invention further pertains to a logging tool to determine a formation property, comprising a tool body; a first antenna array and a second antenna array carried on the tool body, the first and second antenna arrays each having at least one transmitter and two or more receivers to provide received signals; and a processor to: combine the first antenna array received signals and the second antenna array received signals, produce first and second antenna array direct and derivative responses, and synthesize a desired antenna array response that is used to determine the formation property.

The present invention further pertains to the sub-combination of an antenna for use in a logging tool comprising a conductive body having a cavity therein; a first conductive probe extending across the cavity along a first axis; second and third conductive probes extending across the cavity along parallel axes that are perpendicular to the first axis; wherein none of the conductive probes is in direct electrical contact with either of the other conductive probes. To avoid such electrical contact, the first or the second and the third or all three conductive probes may be notched.

BRIEF DESCRIPTION OF THE DRAWINGS

For a more complete understanding of the disclosed method and apparatus, reference should be made to the embodiments illustrated in greater detail on the accompanying drawings.

It should be understood that the drawings are not necessarily to scale and that the disclosed embodiments are sometimes illustrated diagrammatically and in partial views. In certain instances, details that are not necessary for an understanding of the disclosed method and apparatus or that render other details difficult to perceive may have been omitted. It should be understood, of course, that this disclosure is not limited to the particular embodiments illustrated herein.

DETAILED DESCRIPTION

This disclosure relates to a method for synthesizing a desired antenna response from a combination of real antenna responses to provide more accurate and useful information during electromagnetic logging of a formation. Also disclosed are antenna arrays that are particularly suited for providing the combination of real antenna responses that are used to synthesize the desired antenna response. The method and apparatus disclosed herein may be used with a downhole tool, which includes both while-drilling and wireline applications. Various types of desired antenna responses may be synthesized to provide more accurate and useful information regarding subterranean formations, such as to determine permittivity, conductivity, or other formation characteristics.

Figure 1:
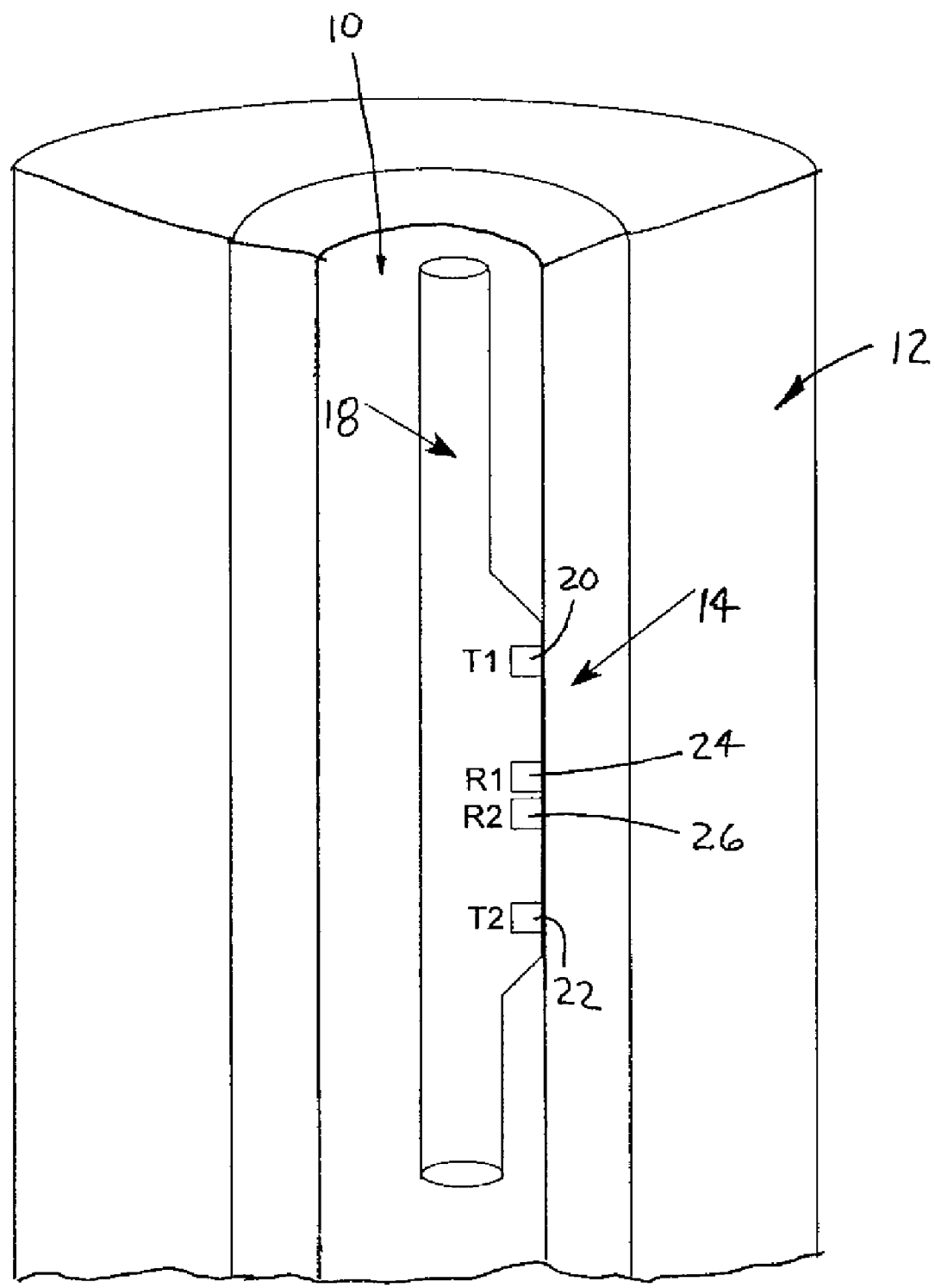
FIG. 1 schematically illustrates a logging tool disposed within a borehole formed in a formation.

FIG. 1 schematically illustrates a typical borehole 10 formed in a subterranean formation 12. The borehole 10 includes a standoff layer 14 of mudcake which is formed during drilling operations. Mud filtrate may infiltrate the formation 12 to form an invaded zone of formation adjacent the standoff layer 14. A logging tool 18 is sized for insertion into the borehole 10 and is configured to conduct logging operations. As such, the logging tool 18 may include a pair of transmitting antennas 20, 22 and a pair of receiving antennas 24, 26. In operation, the transmitters 20, 22 transmit electromagnetic energy into the standoff layer 14 and formation 12, while the receiving antennas 24, 26 receive electromagnetic energy that has propagated through the standoff layer 14 and formation 12 and produce response signals. The response signals may be used to determine phase shift, attenuation, or other measurements. These measurements may then be used to obtain the dielectric constant, conductivity, or other characteristics of the formation.

As noted above, certain components of electromagnetic energy provide improved response characteristics. A transverse electric (TE) wave, for example, has improved standoff immunity, while a transverse magnetic wave (TM) has higher vertical resolution. The standoff 14 and formation 12 structures form a layered medium, with a boundary extending between the different layers. The electric field components of a pure TE wave propagating into the formation are parallel to the boundary plane, and therefore none of the TE wave is reflected at the boundary. A pure TM wave, however, has at least one electric field component that is perpendicular to the boundary plane, and therefore a portion of the TM wave will reflect at the boundary. The amount of reflection is proportional to the difference between permittivities of the two layers. The portion of electromagnetic energy that is reflected off of the boundary propagates through the standoff layer, and therefore the TM wave has increased sensitivity to the standoff layer.

An example of a pure TE antenna is a current loop mounted a distance d above a ground plane. The current loop above the ground plane generates a vertical magnetic quadrupole having a standoff response given by the following expression:

$$S_{TE}(\rho) = -d^2 \frac{iIA}{\pi} \left[ \frac{k_1^3}{2\rho^2} \left\{ 1 + \frac{i4}{k_1\rho} - \frac{9}{(k_1\rho)^2} - \frac{i9}{(k_1\rho)^3} \right\} e^{ik_1\rho} + \int_0^\infty dk_\rho k_\rho^3 k_{1z} J_0(k_\rho\rho) \frac{R_{U1}^{TE} e^{i2k_{1z}h}}{1 + R_{U1}^{TE} e^{i2k_{1z}h}} \right] \quad (1)$$

where S is the measured voltage at a distance $\rho$ from the antenna, I is the current circulating in the loop, A is the loop area, $J_0$ is the zeroth order Bessel function, h is the thickness of standoff layer, and $$k_1 = \frac{\omega}{C}\sqrt{\varepsilon_{1r}\mu_{1r}} \quad (2)$$

is the wave propagation constant characteristic of medium 1 (i.e., the standoff layer). In (2), $\omega$ is the angular frequency, C is the speed of light in vacuum, $\epsilon_r$ is the relative dielectric permittivity, and $\mu_r$ is the relative permeability of the medium. For most geological formations the relative permeability is one and can be ignored. The propagation constant is a vector that in a cylindrical coordinate system is given by, $$\vec{k}_1 = \hat{\rho}k_{1\rho} + \hat{z}k_{IZ} \quad (3)$$

In addition, $k_\rho$ is the variable of Sommerfeld identity, and the reflection coefficient is defined as, $$R_{U1}^{TE} = \frac{\mu_2 k_{1z} - \mu_1 k_{2z}}{\mu_2 k_{1z} + \mu_1 k_{2z}} \quad (4)$$

The response in (1) is made up of two terms: the first term is the response in a homogeneous medium while the second (or integral) term contains a TE reflection coefficient and is the layered medium response of a TE antenna.

As a pure TE antenna, the current loop has very good immunity to the standoff layer. As a practical matter, however, it is very difficult to build a current loop antenna that is suitable for downhole applications.

An open coaxial cable, on the other hand, generates a vertical electric dipole, which is a purely TM antenna. The standoff response of this array is given by the expression:

$$S_{TM}(\rho) = i\omega\mu\frac{Il}{\pi}\left[\frac{1}{2\rho}\left\{1 + \frac{i}{k_1\rho} - \frac{1}{(k_1\rho)^2}\right\}e^{ik_1\rho} + \frac{i}{k_1^2}\int_0^\infty dk_\rho \frac{k_\rho^3}{k_{1s}} J_0(k_\rho\rho)\frac{R_{U1}^{TM} e^{i2k_{1z}h}}{1 - R_{U1}^{TM} e^{i2k_{1z}h}}\right] \quad (5)$$

with $$R_{U1}^{TM} = \frac{\varepsilon_2 k_{1z} - \varepsilon_1 k_{2z}}{\varepsilon_2 k_{1z} + \varepsilon_1 k_{2z}}.$$

Again the response is the sum of a homogeneous medium term and a layered term. The latter contains only the TM reflection coefficient indicating that there is no TE mode present.

Figure 2:
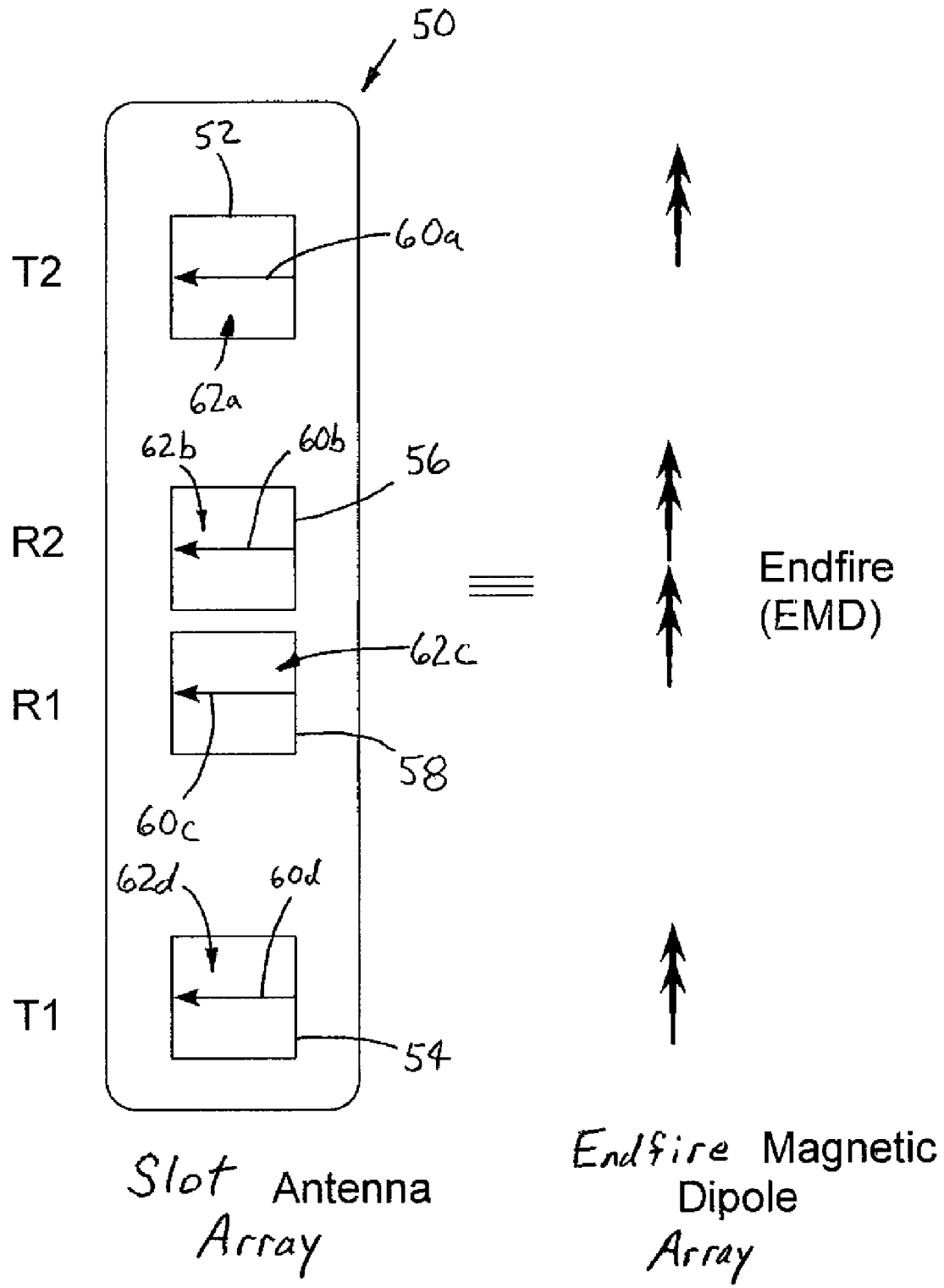
FIG. 2 schematically illustrates an endfire antenna array and the vertical magnetic dipoles resulting therefrom.

The actual antennas used in dielectric logging tools are slot antennas. One example of an antenna array using slot antennas is schematically illustrated in FIG. 2. The array 50 includes first and second transmitting antennas 52, 54 and first and second receiving antennas 56, 58. Consistent with the slot antenna design, each of these antennas has a probe 60a-d, respectively, extending across a cavity 62a-d, respectively, as shown in FIG. 2. When energized, each such slot antenna produces an electromagnetic field pattern that is equivalent to that of a magnetic dipole perpendicular to the probe. Thus, a slot antenna may be considered as equivalent to a magnetic dipole. If, as shown in FIG. 2, the probes 60a-d are perpendicular to the array axis (and therefore the dipoles are parallel to the array axis), the antennas are said to be in an "endfire" configuration ("EMD"). The standoff response of an EMD array is given by the following expression:

$$S_e(\rho) = \frac{iM}{\pi}\left[-\frac{k_1}{\rho^2}\left\{1 + \frac{i}{k_1\rho}\right\}e^{ik_1\rho} + \frac{k_1^2}{\rho}\int_0^\infty dk_\rho\frac{1}{k_{1z}}J_1(k_\rho\rho)\frac{R_{U1}^{TM} e^{i2k_{1z}h}}{1 - R_{U1}^{TM} e^{i2k_{1z}h}} - \int_0^\infty dk_\rho k_\rho k_{1z} J_1'(k_\rho\rho)\frac{R_{U1}^{TE} e^{i2k_{1z}h}}{1 + R_{U1}^{TE} e^{i2k_{1z}h}}\right] \quad (6)$$

where M is the magnetic dipole moment of the antenna. The standoff response shown in equation (6) includes a homogeneous medium term, a TM term, and a TE term. Accordingly, the response of a slot antenna is not purely TE or purely TM, but rather is a combination of the two modes. The relative magnitudes of the two integral terms in equation (6) determine the extent of TE or TM contribution in the response of the EMD array. Since these terms are functions of $k_1$ and $k_2$ the percent of contribution is not constant and can vary as a function of depth in the borehole.

Figure 3:
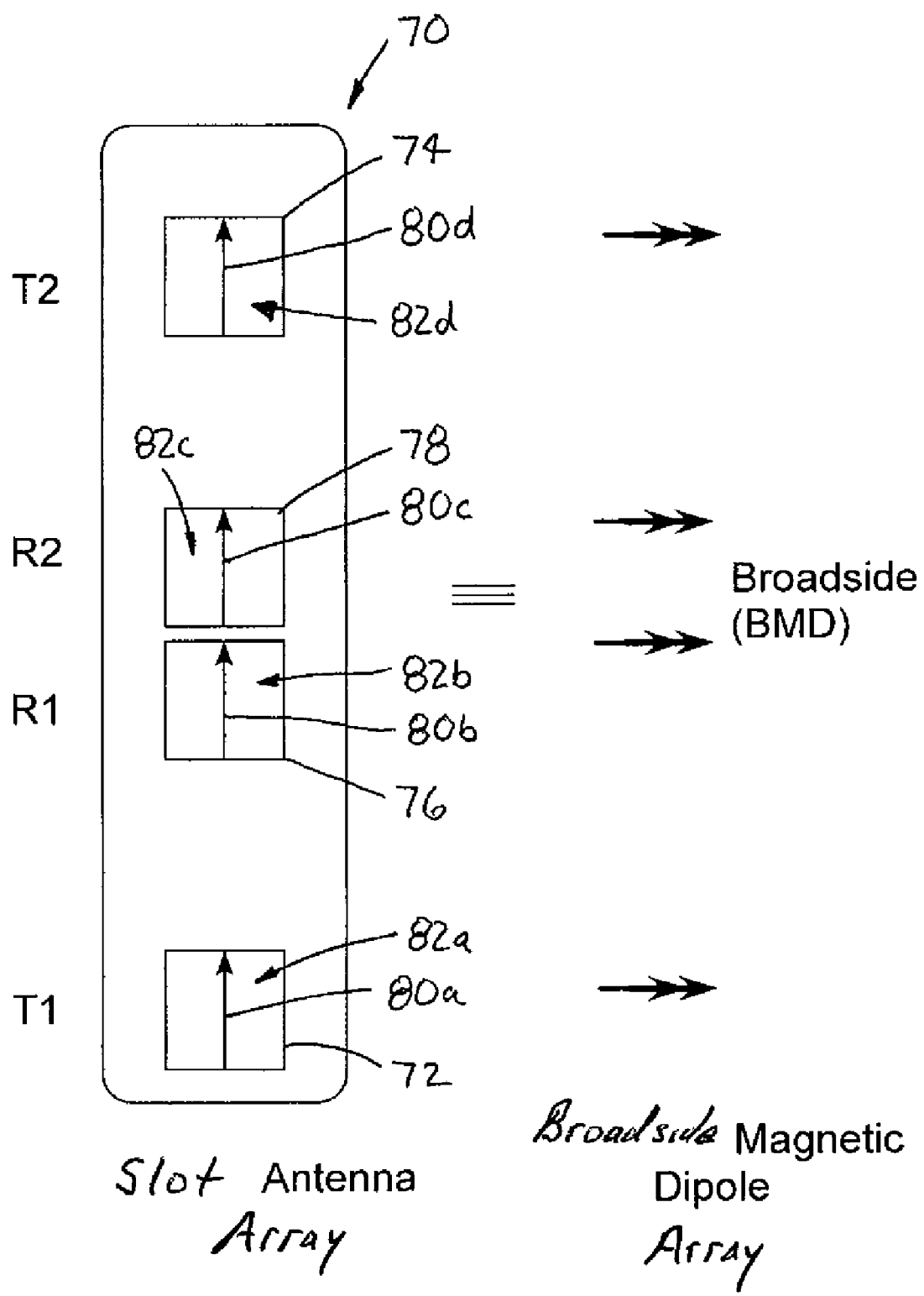
FIG. 3 schematically illustrates a broadside antenna array and the horizontal magnetic dipoles resulting therefrom.

A similar antenna array using slot antennas is schematically illustrated in FIG. 3. The array 70 includes transmitting antennas 72, 74 and receiving antennas 76, 78. Probes 80a-d extend across cavities 82a-d, respectively. As schematically illustrated, the probes 80a-d are parallel to the array axis, which is called a "broadside" configuration ("BMD"). In this array 70, the magnetic dipoles are perpendicular to the array axis. The standoff response of the BMD array is given by:

$$S_b(\rho) = \frac{iM}{\pi} \begin{bmatrix} -\frac{ik_1^2}{2\rho}\left\{1 + \frac{i}{k_1\rho} - \frac{1}{(k_1\rho)^2}\right\}e^{ik_1\rho} + \\ k_1^2 \int_0^\infty dk_\rho \frac{k_\rho}{k_{1z}} J_1'(k_\rho\rho) \frac{R_{U1}^{TM} e^{i2k_{1z}h}}{1 - R_{U1}^{TM} e^{i2k_{1z}h}} - \\ \frac{1}{\rho} \int_0^\infty dk_\rho k_{1z} J_1(k_\rho\rho) \frac{R_{U1}^{TE} e^{i2k_{1z}h}}{1 + R_{U1}^{TE} e^{i2k_{1z}h}} \end{bmatrix} \quad (7)$$

Similar to the EMD response, equation (7) is a combination of homogeneous medium response and layered medium responses for TE and TM modes.

Alternatively, similar expressions can be derived for the case in which the array comprises two antennas that are mutually perpendicular. For example, the array could have a transmitter with a magnetic dipole moment parallel to the tool axis and a receiver with a magnetic dipole moment perpendicular to the tool axis. Such an array is referred to herein as a "crossfire array". Measurements using a crossfire array may be made using, for example, the cross dipole arrays shown in FIG. 5. This is applicable to induction and propagation resistivity tools which commonly employ loop or coil-type antennas that can be arranged variously along axes that are parallel, tilted, or transverse to the tool axis. As used herein, a "tilted array" means an array in which at least one antenna is tilted relative to the tool axis.

From a mathematical standpoint, similarities in equations (1), (5), (6), and (7) can be exploited to synthesize a pure TE or TM response from a combination of BMD and EMD responses. A pure TM response ("TMD") may be obtained by combining the endfire response and the derivative of the broadside response as shown in the following exemplary expression:

$$S_{TMD}(\rho) = S_e(\rho) - \frac{\partial}{\partial \rho}(\rho S_b(\rho)) \quad (8)$$

which upon substitution leads to:

$$S_{TMD}(\rho) = ik_1^2 \frac{M}{\pi} \begin{bmatrix} -\frac{1}{2}k_1\left\{1 + \frac{i}{k_1\rho}\right\}e^{ik_1\rho} + \\ \rho \int_0^\infty dk_\rho \frac{k_\rho^2}{k_{1z}} J_1(k_\rho\rho) \frac{R_{U1}^{TM} e^{i2k_{1z}h}}{1 - R_{U1}^{TM} e^{i2k_{1z}h}} \end{bmatrix} \quad (9)$$

The TMD response expressed in equation (9) is similar to the pure TM antenna response of equation (5) in that it does not include a term with the TE reflection coefficient. Thus, the TMD response is purely TM. It is instructive to note that equation (9) is not the same as equation (5), in that equation (9) is not used to synthesize the response of a vertical electric dipole. Rather (9) is the TM response of a different antenna, which in the above example is the response of a horizontal magnetic dipole oriented along a 45 degree angle.

A pure TE response can similarly be synthesized from equations (6) and (7) by combining the broadside response and the derivative of the endfire response as shown in the following expression:

$$S_{TED}(\rho) = S_b(\rho) - \frac{\partial}{\partial \rho}(\rho S_e(\rho)) \quad (10)$$

This leads to:

$$S_{TED}(\rho) = -\frac{M}{\pi\rho} \begin{bmatrix} \frac{1}{2}k_1^2\left\{1 + \frac{i3}{k_1\rho} - \frac{3}{(k_1\rho)^2}\right\}e^{ik_1\rho} + \\ i\rho^2 \int_0^\infty dk_\rho k_\rho^2 k_{1z} J_1(k_\rho\rho) \frac{R_{U1}^{TE} e^{i2k_{1z}h}}{1 + R_{U1}^{TE} e^{i2k_{1z}h}} \end{bmatrix} \quad (11)$$

Similar to the pure TE antenna response of equation (1), the TED response expressed in equation (11) contains a homogeneous medium term, and a layered medium term containing only the TE reflection coefficient. Neither of equations (1) and (11) includes a term containing the TM reflection coefficient.

Figure 4A:
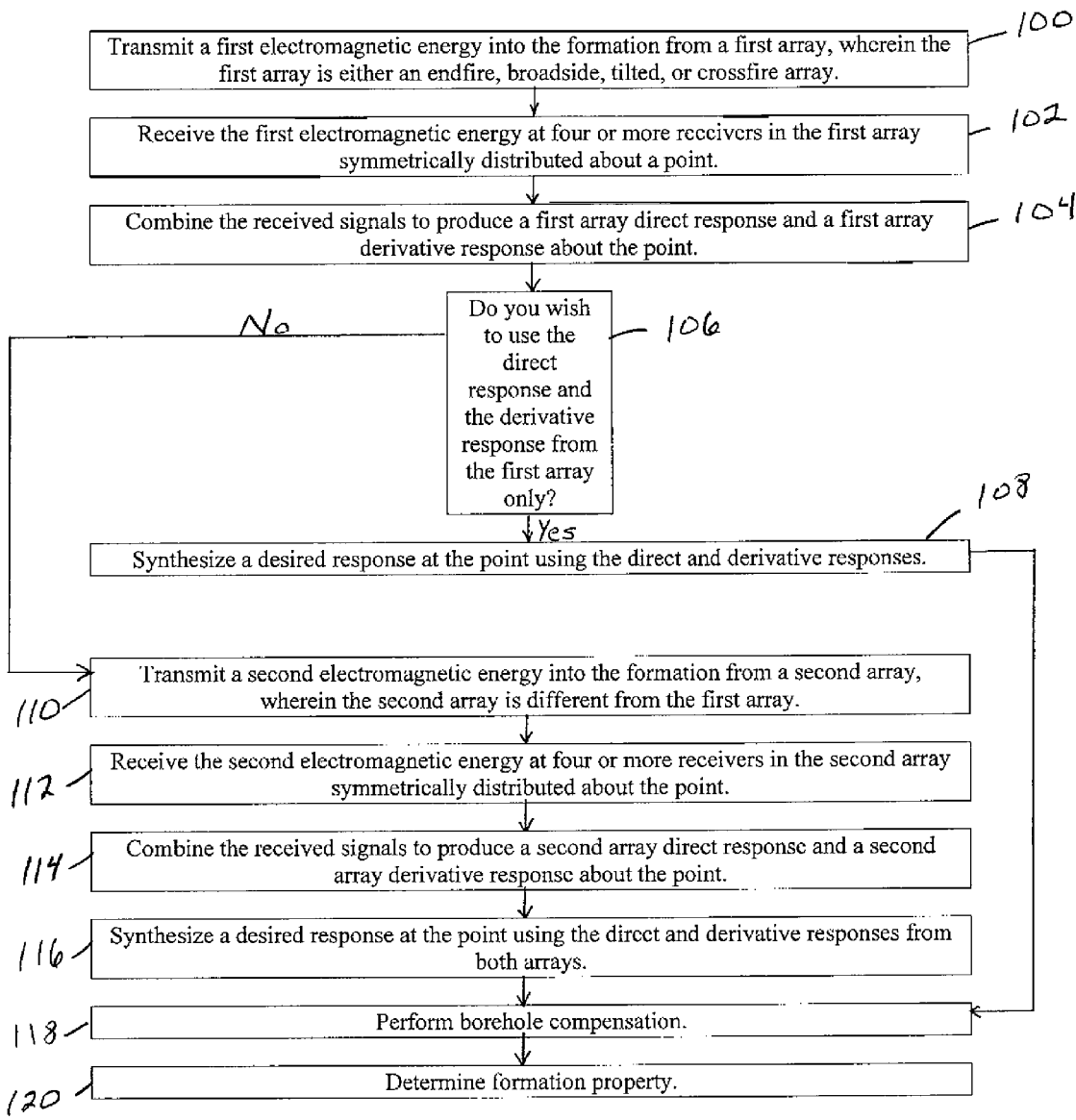
FIG. 4A is a flowchart schematically illustrating a method of synthesizing a desired antenna response from a combination of measured antenna responses wherein transmitter and receiver gains are not known.

The foregoing provides a method of synthesizing a desired antenna response from a combination of measured antenna responses in which the transmitter and receiver gains are not known. The method can be used to determine properties of formations surrounding a borehole that is traversed by a logging device. An embodiment of the method is schematically illustrated in FIG. 4A and performed as follows. Transmit (100) a first electromagnetic energy into the formation from a first array, wherein the first array is either an endfire, broadside, tilted, or crossfire array. Receive (102) the first electromagnetic energy at four or more receivers in the first array symmetrically distributed about a point. Combine (104) the received signals to provide a first array direct response and a first array derivative response about the point. The above combinations from a single array allow the computation of the direct response and derivative response of that array. In certain cases (106—yes), that may be sufficient information to synthesize (108) the desired response. Because the transmitter and receiver gains are not known, the synthesized response is preferably borehole compensated (118). Borehole compensation is described in more detail below.

Other cases (106—no) may require the direct response and derivative response from a different array. In that case further steps are required, as follows. Transmit (110) a second electromagnetic energy into the formation from a second array, wherein the second array is different from the first array. Receive (112) the second electromagnetic energy at four or more receivers in the second array symmetrically distributed about the point. Combine (114) the received signals to provide a second array direct response and a second array derivative response about the point. Synthesize (116) a desired response at the point using the combined signals from both arrays. Again, because the transmitter and receiver gains are not known, the synthesized response is preferably borehole compensated (118). Finally, the formation property is determined (120).

Figure 4B:
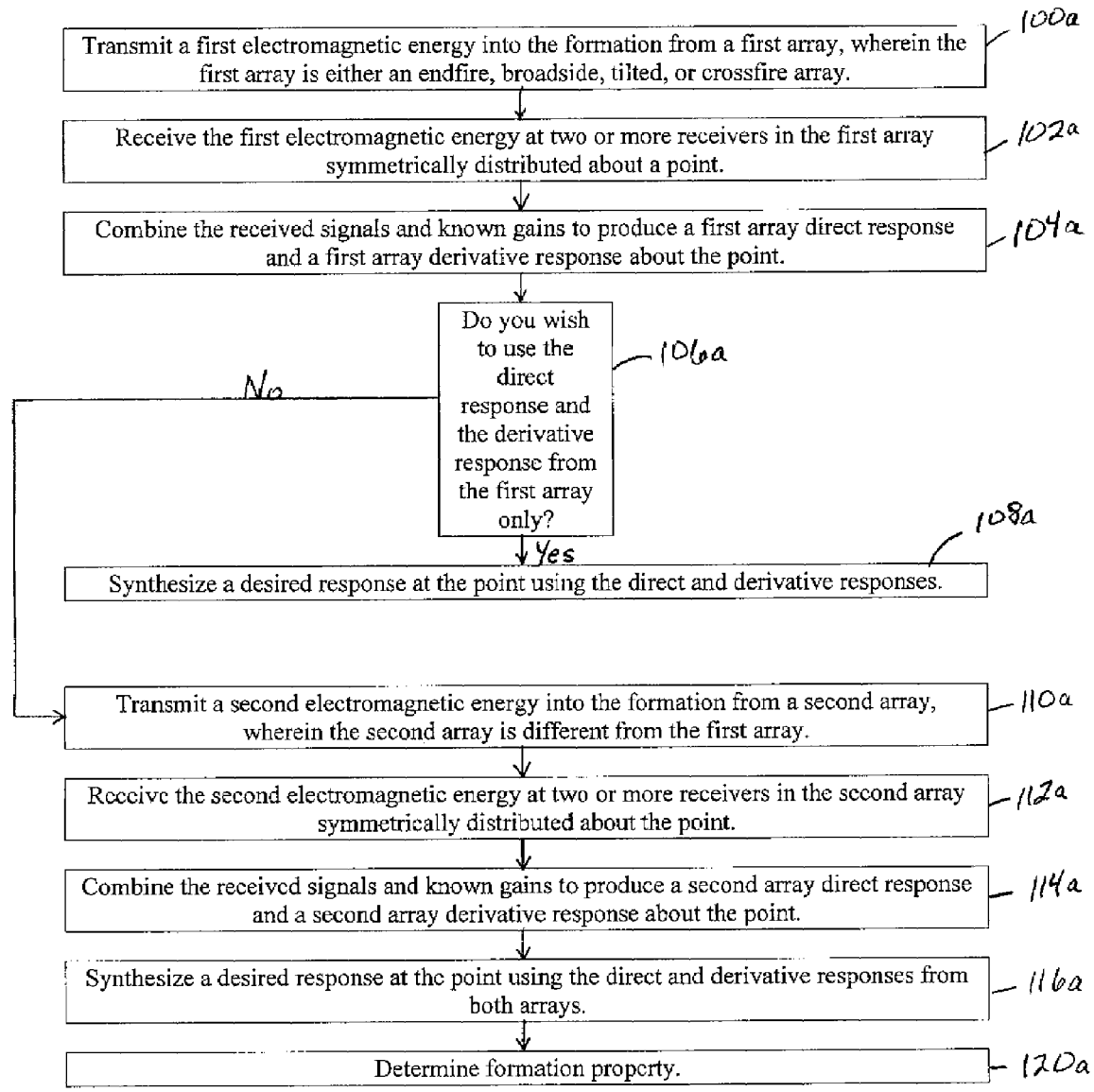
FIG. 4B is a flowchart schematically illustrating a method of synthesizing a desired antenna response from a combination of measured antenna responses wherein transmitter and receiver gains are known.

The method also includes synthesizing a desired antenna response from a combination of measured antenna responses in which the transmitter and receiver gains are known. This embodiment of the method is schematically illustrated in FIG. 4B and performed as follows. Transmit (100a) a first electromagnetic energy into the formation from a first array, wherein the first array is either an endfire, broadside, or crossfire array. Receive (102a) the first electromagnetic energy at four or more receivers in the first array symmetrically distributed about a point. Combine (104a) the received signals and known gains to provide a first array direct response and a first array derivative response about the point. The above combinations from a single array allow the computation of the direct response and derivative response of that array. In certain cases (106a—yes), that may be sufficient information to synthesize (108a) the desired response.

Other cases (106a—no) may require the direct response and derivative response from a different array. In that case further steps are required, as follows. Transmit (110a) a second electromagnetic energy into the formation from a second array, wherein the second array is different from the first array. Receive (112a) the second electromagnetic energy at four or more receivers in the second array symmetrically distributed about the point. Combine (114a) the received signals and known gains to provide a second array direct response and a second array derivative response about the point. Synthesize (116a) a desired response at the point using the combined signals from both arrays. Because the gains are known, borehole compensation is not required, and the formation property can be determined (120a).

Based on the foregoing mathematical analysis, antenna arrays may be developed to provide the measurements for synthesizing pure TE and TM responses. Specifically, as shown in equations (8) and (10), pure TE and TM responses may be obtained from normal EMD and BMD measurements as well as some derivatives of these measurements. As a practical matter, the derivatives of the EMD and BMD measurements may be approximated by computing a difference quotient of the response between two antennas. For example, TED response may be synthesized by a combination of BMD response and the derivative of the EMD response. In addition to providing broadside antennas to obtain the normal BMD response, two endfire antennas may be placed at different locations to measure the difference in endfire response, thereby providing data to approximate the derivative of the EMD response. Conversely, for TMD response, endfire antennas may be provided to obtain the normal EMD response and two broadside antennas may be placed at different locations to measure the difference in broadside response, thereby providing data to approximate the derivative of the BMD response. The normal and differential responses should be taken from the same point, and therefore the "differential" antennas should be placed symmetrically around the "normal" antenna. More specifically, for TED synthesis, the endfire antennas should be placed symmetrically about the broadside antenna, while for TMD synthesis, the broadside antennas should be placed symmetrically about the endfire antenna.

Figure 5:
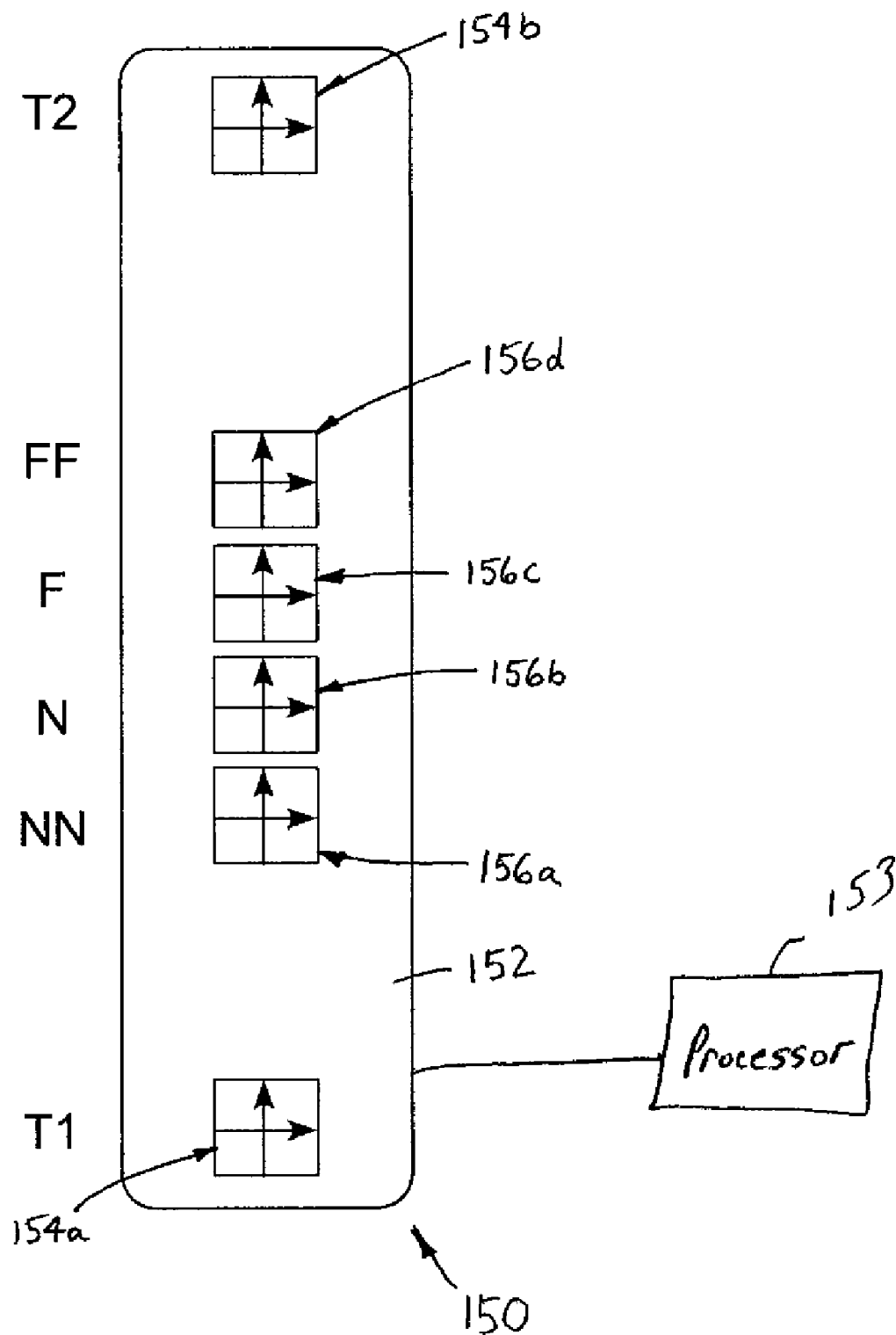
FIG. 5 schematically illustrates a cross dipole antenna array suitable for obtaining measurements used to synthesize desired antenna responses.

One embodiment of an antenna array capable of providing measurements for TED and TMD synthesis is illustrated in FIG. 5. The antenna array 150 is provided on a body 152 of a logging tool having a longitudinal axis that is vertical as shown in FIG. 5. The array 150 includes six cross dipole antennas, which can be used to generate both endfire and broadside responses at the same location. Two transmitter antennas 154a-b are positioned at opposite ends of the array 150 of the logging tool body 152. In addition, four receiver antennas 156a-d are provided in the center of the array 150 and are equally spaced from one another and referred to in the figure as NN, N, F, and FF, respectively, along the logging tool body. As a result, the difference between signals at NN and F is centered at N, while the difference between signals at FF and N is centered at F. The longitudinal space between transmitter 154a and receiver 156a is substantially the same as the space between transmitter 154b and receiver 156d. A processor 153 is also disposed on or within tool body 152 to perform certain calculations such as computing the derivative response, though the processor 153 could also be uphole at the surface.

With this array 150, equation (10) for calculating TED can be approximated as:

$$S(\rho_N) \approx S_b(\rho_N) - \frac{\rho_F S_e(\rho_F) - \rho_{NN} S_e(\rho_{NN})}{2(\rho_F - \rho_{NN})} \quad (11)$$

at N, and:

$$S(\rho_F) \approx S_b(\rho_F) - \frac{\rho_{FF} S_e(\rho_{FF}) - \rho_N S_e(\rho_N)}{2(\rho_{FF} - \rho_N)} \quad (12)$$

at F, when transmitter antenna 154a is excited. The relative response between those signals is given by:

$$S_{TED} \approx \{S_b(\rho_F) - S_b(\rho_N)\} - \quad (13)$$
$$\left\{ \frac{\rho_{FF} S_e(\rho_{FF}) - \rho_N S_e(\rho_N)}{2(\rho_{FF} - \rho_N)} - \frac{\rho_F S_e(\rho_F) - \rho_{NN} S_e(\rho_{NN})}{2(\rho_F - \rho_{NN})} \right\}$$

Analyzing equation (13), it is instructive to note that the difference in the first set of braces ("first term") is the response of a regular BMD array, and therefore has the same large intensity that is characteristic of a BMD array response. The difference in the second set of braces ("second term") is a correction that approximates the derivative of the EMD, thereby converting the response to that of a pure TE antenna. Since the second term is the difference between two EMD responses, its magnitude is smaller than the first term. Thus the response of (13) is characterized by the high signal strength of the BMD arrays and the desired standoff response of TE arrays.

While the exemplary embodiment of FIG. 5 illustrates an antenna array using cross dipole antennas, it will be appreciated that other types of antennas may be employed that still allow the desired antenna responses to be synthesized. For example, each cross dipole antenna could be split into a combination of separate endfire and broadside antennas, albeit with some degradation in response accuracy. Furthermore, the word "antenna" is used herein to include a unitary antenna structure that is capable of transmitting or receiving electromagnetic energy, such as a probe. Accordingly, each cross dipole antenna noted above can be said to include two antennas.

Figure 6:
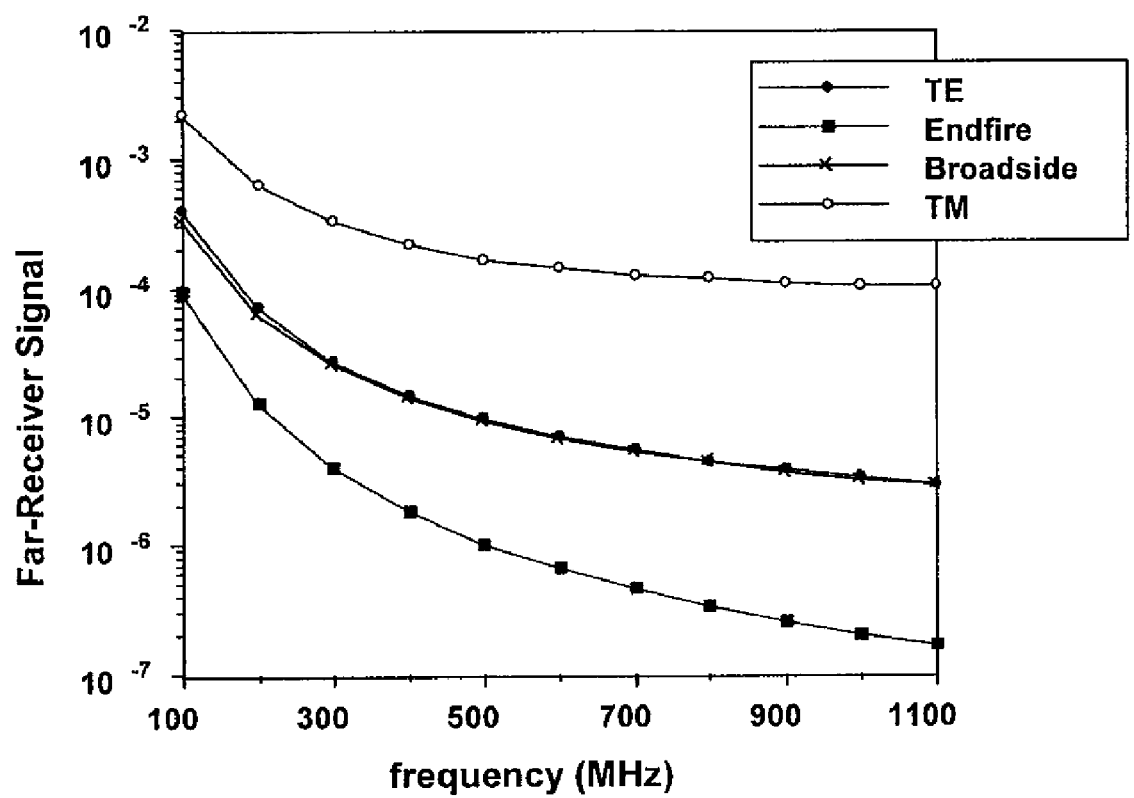
FIG. 6 is a graph plotting a far receiver signal versus frequency for the TE, TM, EMD, and BMD arrays.

The modeling results presented in FIG. 6 confirm that the response of equation (13) has the expected high intensity similar to that of a BMD array. FIG. 6 shows the signal received by the receiver positioned farthest from the transmitter plotted as a function of frequency for each of the EMD, BMD, TED, and TMD signals. The BMD and TED signal levels are nearly identical, verifying that the correction term in (13) is smaller than the homogeneous medium term.

Expressions similar to (11), (12), and (13) can be developed for obtaining a response when the transmitting antenna 154b is excited. These results are averaged with the response from the transmitting antenna 154a for borehole compensation. Borehole compensation is used to compensate, for example, for antenna gain or electronic drift. To perform borehole compensation, one repeats steps 100-116 of FIG.

4A using transmitting antenna 154b, and then computes the average of the synthesized responses from transmitting antennas 154a and 154b.

Figure 7:
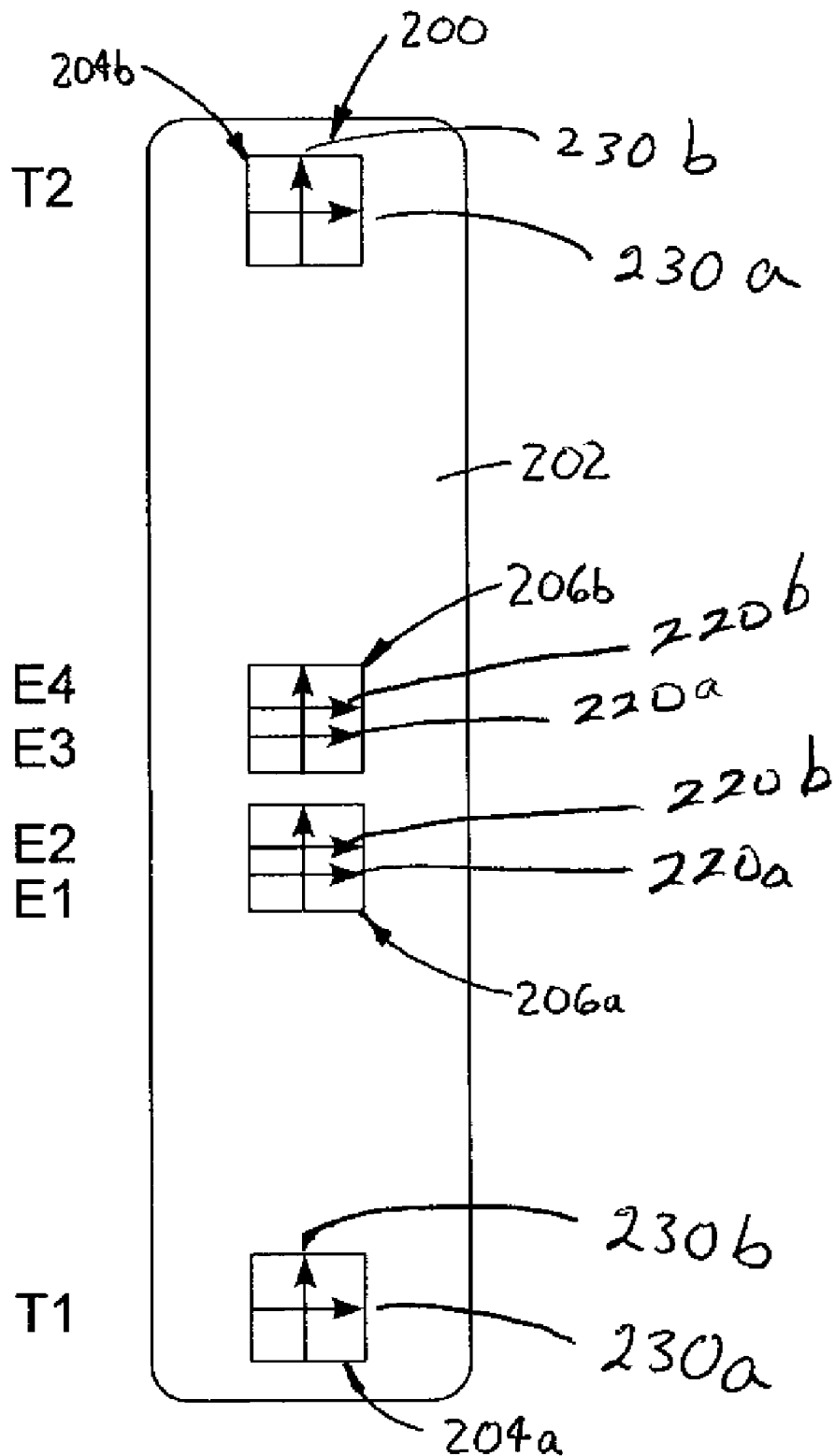
FIG. 7 schematically illustrates a cross dipole and double cross antenna array suitable for obtaining measurements used to synthesize desired antenna responses.

An alternative antenna array capable of providing measurements for TED synthesis is illustrated in FIG. 7. The antenna array 200 is provided on a body 202 of a logging tool having a longitudinal axis that is vertical as shown in FIG. 7. The array 200 includes a total of four antennas: two cross dipole transmitter antennas 204a-b positioned at opposite ends of the array, and two double cross receiver antennas 206a-b positioned in the center of the array 200. This embodiment allows the use of two receivers instead of four in steps 102, 112 of FIG. 4A.

Figure 8:
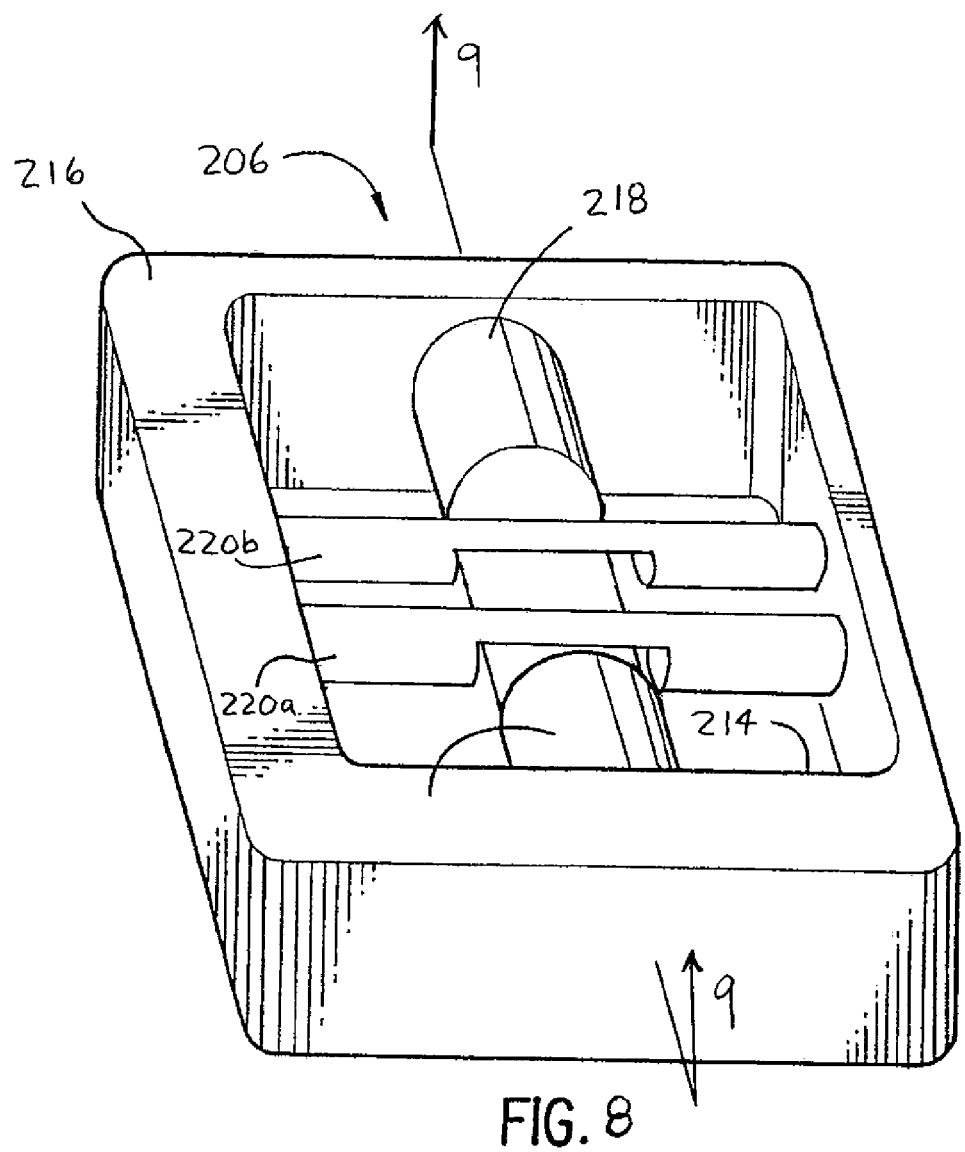
FIG. 8 is a perspective view illustrating one embodiment of a double cross antenna.
Figure 9:
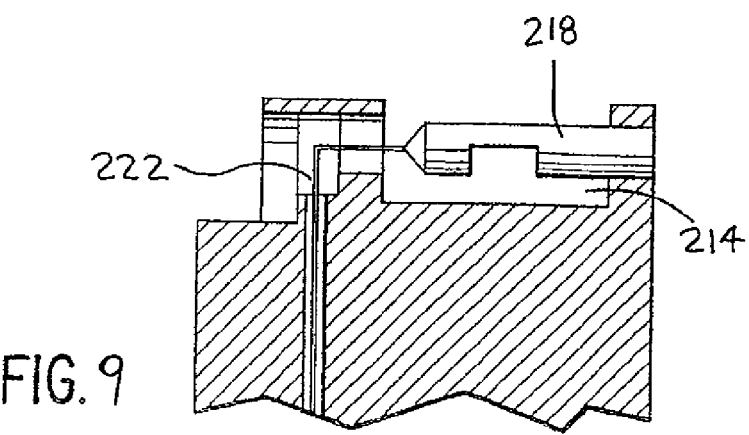
FIG. 9 is a cross-sectional view of the double cross antenna taken along line 9-9 of FIG. 8.

As best shown in FIGS. 8 and 9, each double cross receiver antenna 206 has a generally square aperture or slot 214 formed in a metal body 216. A metal probe element 218 extends across the slot 214 along a first axis, while metal probe elements 220a-b extend across the slot 214 along axes that are perpendicular to the first axis. The probe elements 218, 220 are notched to avoid contact where they cross each other. A dielectric material fills the remainder of the slot 214. The cross-section of FIG. 9 shows one of the probes 218, which is shorted at one end to a wall of the slot 214. The other end of the probe 218 is coupled to a conductor wire 222 which is insulated for passage through the body, and is coupled with transmitter and/or receiver circuitry, depending on the intended purpose of the antenna. The other probes 220 are similarly constructed. Depending on the orientation of the double cross antenna, one can obtain one endfire response and two broadside responses or one broadside response and two endfire responses.

Returning to FIG. 7, the double cross receiver antennas may be oriented so that the probes 220a-b have an endfire configuration. With this configuration, receiver antenna 206a includes a first endfire probe 220a at position E1 and a second endfire probe 220b at position E2. Similarly, receiver antenna 206b has a first endfire probe 220a at position E3 and a second endfire probe 220b at position E4. When transmitter antenna 204a is energized to produce the broadside and endfire responses (i.e., firing transmitter probe 230a for endfire and 230b for broadside), TED may be approximated by:

$$S(\rho_1) \approx S_b(\rho_1) - \frac{\rho_{E2} S_e(\rho_{E2}) - \rho_{E1} S_e(\rho_{E1})}{2(\rho_{E2} - \rho_{E1})} \quad (14)$$

for receiver 206a, and by:

$$S(\rho_2) \approx S_b(\rho_2) - \frac{\rho_{E4} S_e(\rho_{E4}) - \rho_{E3} S_e(\rho_{E3})}{2(\rho_{E4} - \rho_{E3})} \quad (15)$$

for receiver 206b, where p1 is the distance from the transmitter at T1 to the midpoint between the receiver probes located at E1 and E2, and P2 is the distance from the transmitter at T1 to the midpoint between the receiver probes located at E3 and E4. The relative signal is obtained when the results of (14) and (15) are subtracted:

$$S_{TED} \approx \{S_b(\rho_2) - S_b(\rho_1)\} - \quad (16)$$

$$\left\{ \frac{\rho_{E4} S_e(\rho_{E4}) - \rho_{E3} S_e(\rho_{E3})}{2(\rho_{E4} - \rho_{E3})} - \frac{\rho_{E2} S_e(\rho_{E2}) - \rho_{E1} S_e(\rho_{E1})}{2(\rho_{E2} - \rho_{E1})} \right\}$$

to obtain a TE response. Similar terms are obtained from energizing transmitter 204b at position T2 that, when averaged with (16), provide borehole compensation.

Figure 15:
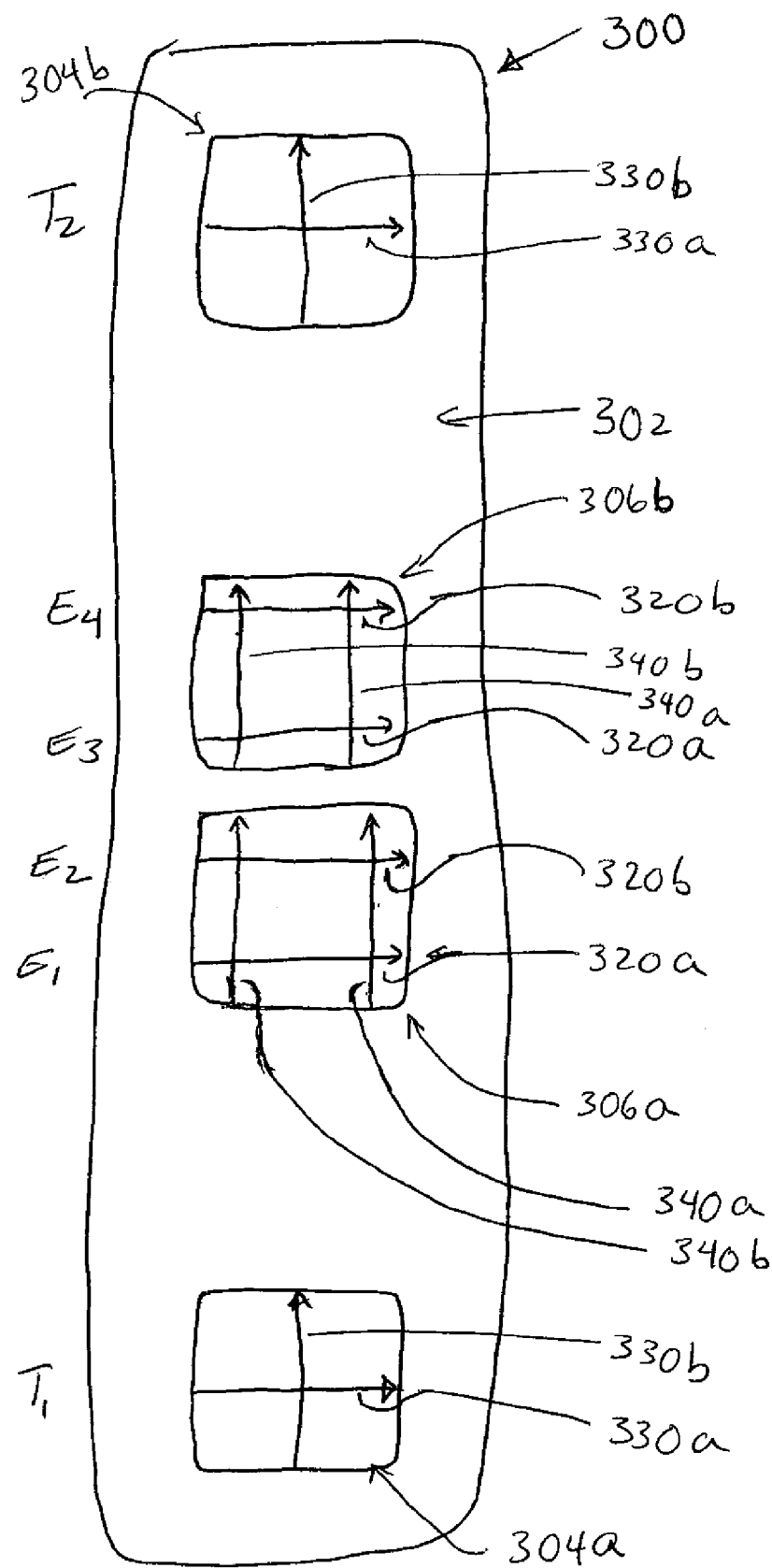
FIG. 15 schematically illustrates a cross dipole and four-cross antenna array suitable for obtaining measurements used to synthesize desired antenna responses.

Yet another alternative antenna array capable of providing measurements for TED and TMD synthesis is illustrated in FIG. 15. The antenna array 300 is provided on a body 302 of a logging tool having a longitudinal axis that is vertical as shown in FIG. 15. The array 300 includes a total of four antennas: two cross dipole transmitter antennas 304a-b positioned at opposite ends of the array, and two four-cross receiver antennas 306a-b positioned in the center of the array 300. This embodiment allows the use of two receivers instead of four in steps 102, 112 of FIG. 4A.

Figure 16:
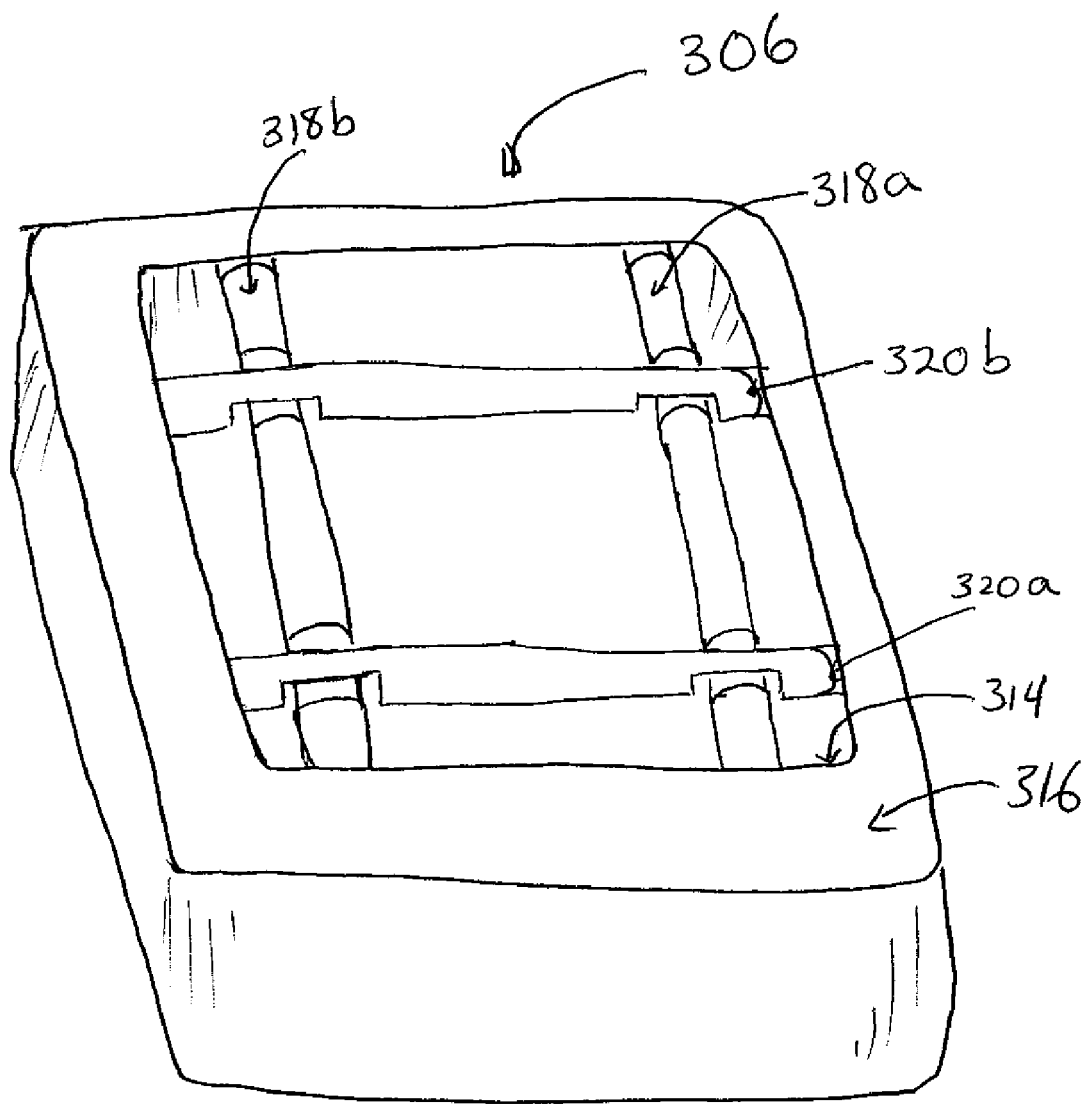
FIG. 16 is a perspective view illustrating one embodiment of a four-cross antenna.

As best shown in FIG. 16, each four-cross receiver antenna 306 has a generally square aperture or slot 314 formed in a metal body 316. Two metal probe elements 318a-b extend across the slot 314 parallel to a first axis, while metal probe elements 320a-b extend across the slot 314 along axes that are perpendicular to the first axis. The probe elements 318, 320 are notched to avoid contact where they cross each other. A dielectric material fills the remainder of the slot 314. With the four-cross antenna, one can obtain two endfire responses and two broadside responses.

Returning to FIG. 15, the four-cross receiver antennas may be oriented so that the probes 320a-b have an endfire configuration and probes 340a-b have a broadside configuration. When transmitter antenna 304a is energized (i.e., firing transmitter probe 330a for endfire and 330b for broadside), the TED response may be approximated by equations similar to (14) and (15), but with the broadside signals $S_b$ being the ratio of the signals of probes 340a and 340b for each receiver 306a-b. The TMD can also be approximated using similar equations, but with the endfire and broadside roles interchanged. Similar terms are obtained from energizing transmitter 304b at position T2, and those terms can be used to provide borehole compensation.

While the above examples have been described in relation to synthesizing a pure TE response, there are some applications in which it is desirable to synthesize a pure TM antenna response. In such cases the cross dipole antennas shown in FIG. 5 can be used. To synthesize the TM response shown in equation (8), the broadside antennas are used for differentiation, leading to:

$$S(\rho_N) \approx S_e(\rho_N) - \frac{\rho_F S_b(\rho_F) - \rho_{NN} S_b(\rho_{NN})}{2(\rho_F - \rho_{NN})} \quad (17)$$

$$S(\rho_F) \approx S_e(\rho_F) - \frac{\rho_{FF} S_b(\rho_{FF}) - \rho_N S_b(\rho_N)}{2(\rho_{FF} - \rho_N)}. \quad (18)$$

These are duals of the TED expressions (11) and (12). The difference between (17) and (18) leads to:

$$S_{TMD} \approx \{S_e(\rho_F) - S_e(\rho_N)\} - \left\{ \frac{\rho_{FF} S_b(\rho_{FF}) - \rho_N S_b(\rho_N)}{2(\rho_{FF} - \rho_N)} - \frac{\rho_F S_b(\rho_F) - \rho_{NN} S_b(\rho_{NN})}{2(\rho_F - \rho_{NN})} \right\} \quad (19)$$

As with (13), the results of (19) suggest a homogeneous medium response (first term) characteristic of an EMD array and the correction term that is a derivative of the BMD array (second term). Result of modeling the signal strength for TMD array is also shown in FIG. 6 and it is even more intense than the plain BMD response. Returning to the modeling results provided in FIG. 6, it appears that the second term in (19) dominates, since the EMD and TMD signals are at opposite extremes, with EMD being the weakest signal and TMD being the strongest signal.

The higher intensity of the TMD mode can be used to enhance the signal intensity in cases where the standoff layer is small and the presence of a TM mode does not lead to significant errors. These results suggest the process of synthesis outlined above leads to the extra feature of amplitude enhancement for both TMD and TED responses, which is attributable to the extra ρ terms that multiply the measurements before they are subtracted, such as shown in expressions (16) and (19).

FIGS. 10-14 are graphs presenting the results of modeling the standoff response of the EMD, BMD, TED, and TMD arrays. In each case, a forward model has been used to calculate the received signal at the receiver antennas. The signals for the far and near receivers were then subtracted to obtain amplitude ratio and phase shift, and these values were inverted to permittivity and conductivity values using a homogeneous medium inversion routine. The use of a homogeneous medium inversion routine is an approximation because the real geometry is not homogeneous and is expected to corrupt the inversion results. However, the use of such an inversion is a generally accepted practice in the field, and still provides a good test of the antenna immunity to the standoff layer.

Figure 10:
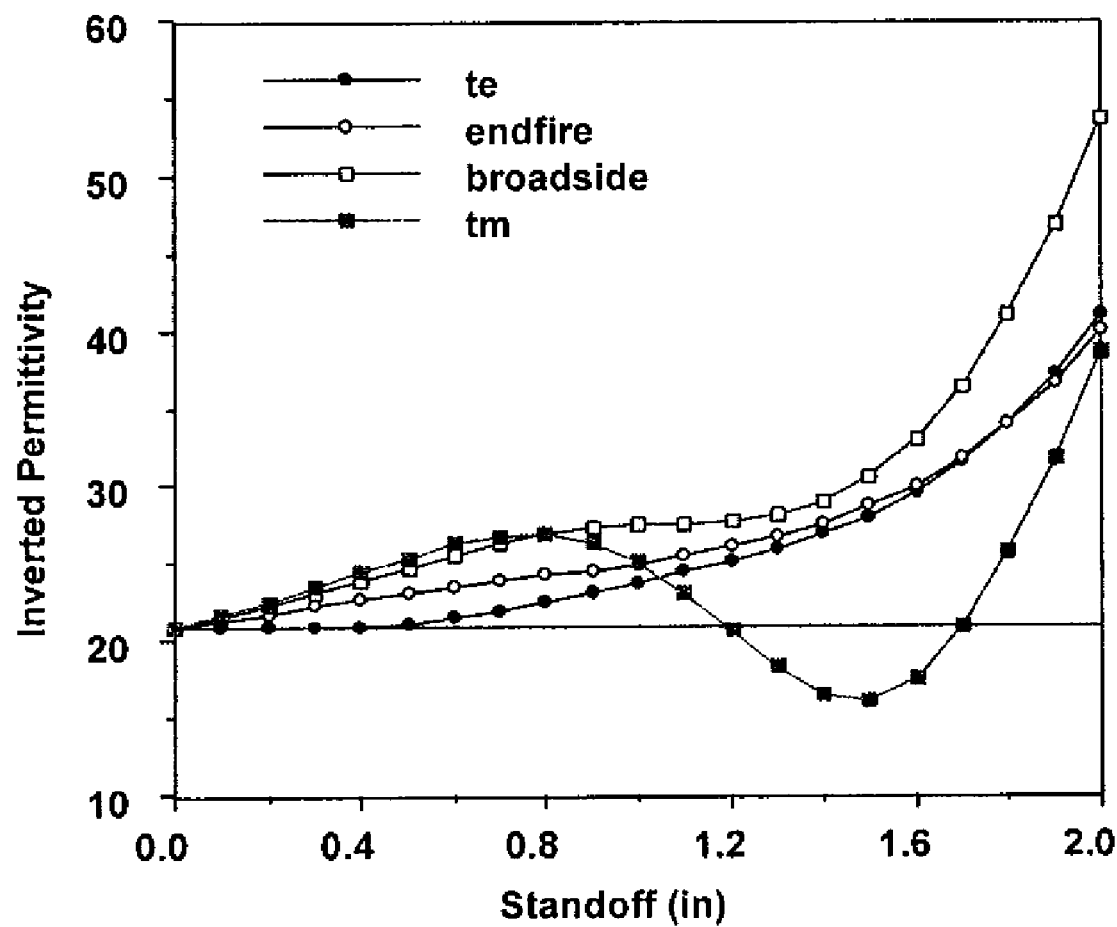
FIG. 10 is a graph plotting inverted permittivity versus standoff thickness for the TE, TM, EMD, and BMD arrays at a frequency of 200 MHz.
Figure 11:
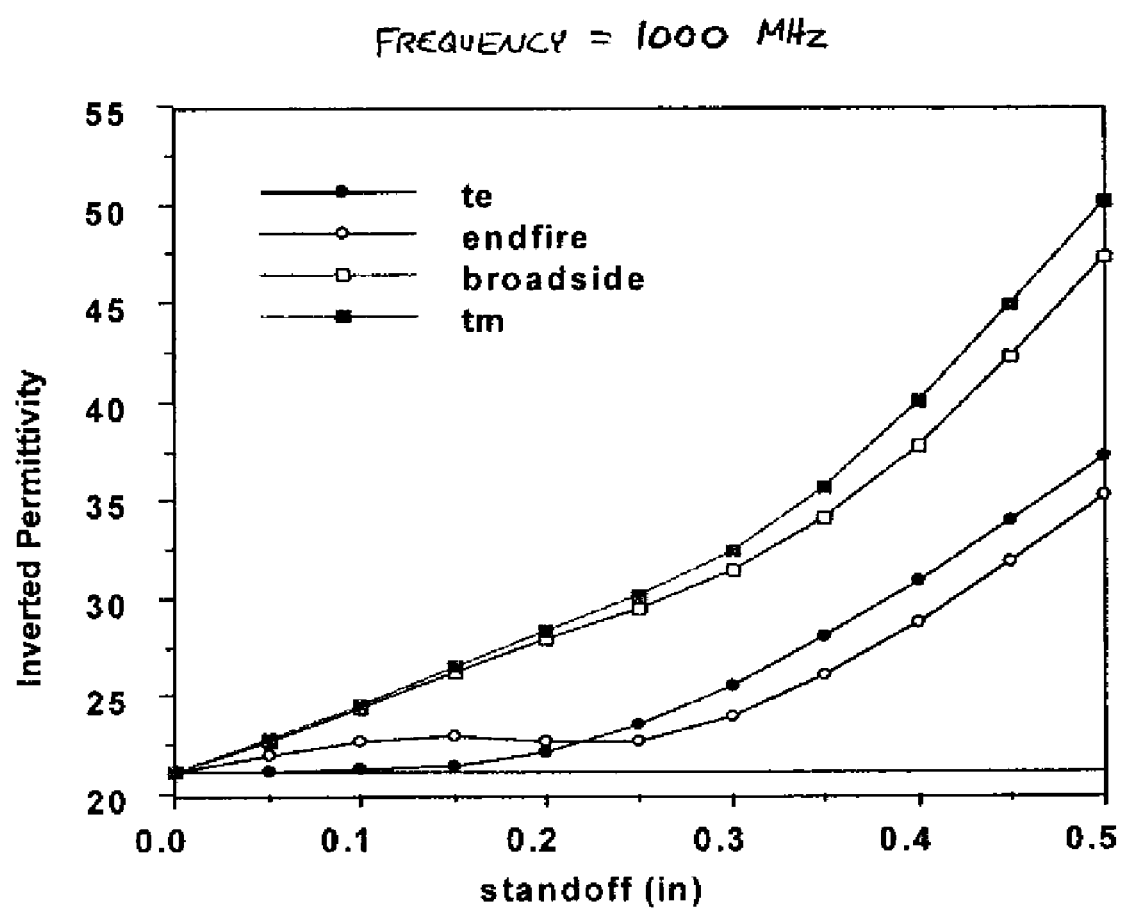
FIG. 11 is a graph plotting inverted permittivity versus standoff thickness for the TE, TM, EMD, and BMD arrays at a frequency of 1000 MHz.

FIGS. 10 and 11 graphically illustrate inverted permittivity response versus standoff thickness at frequencies of 200 and 1000 MHz, respectively. In both instances, the TE array is improved over the EMD array, thereby confirming that the synthesized TE response increases the range of standoff thicknesses that can be tolerated. Conversely, the synthesized TM array has a standoff response that is even worse than the BMD array for both frequencies. A comparison of the two graphs presented at FIGS. 10 and 11 shows that, as expected, immunity to standoff increases with lower frequencies.

Figure 12:
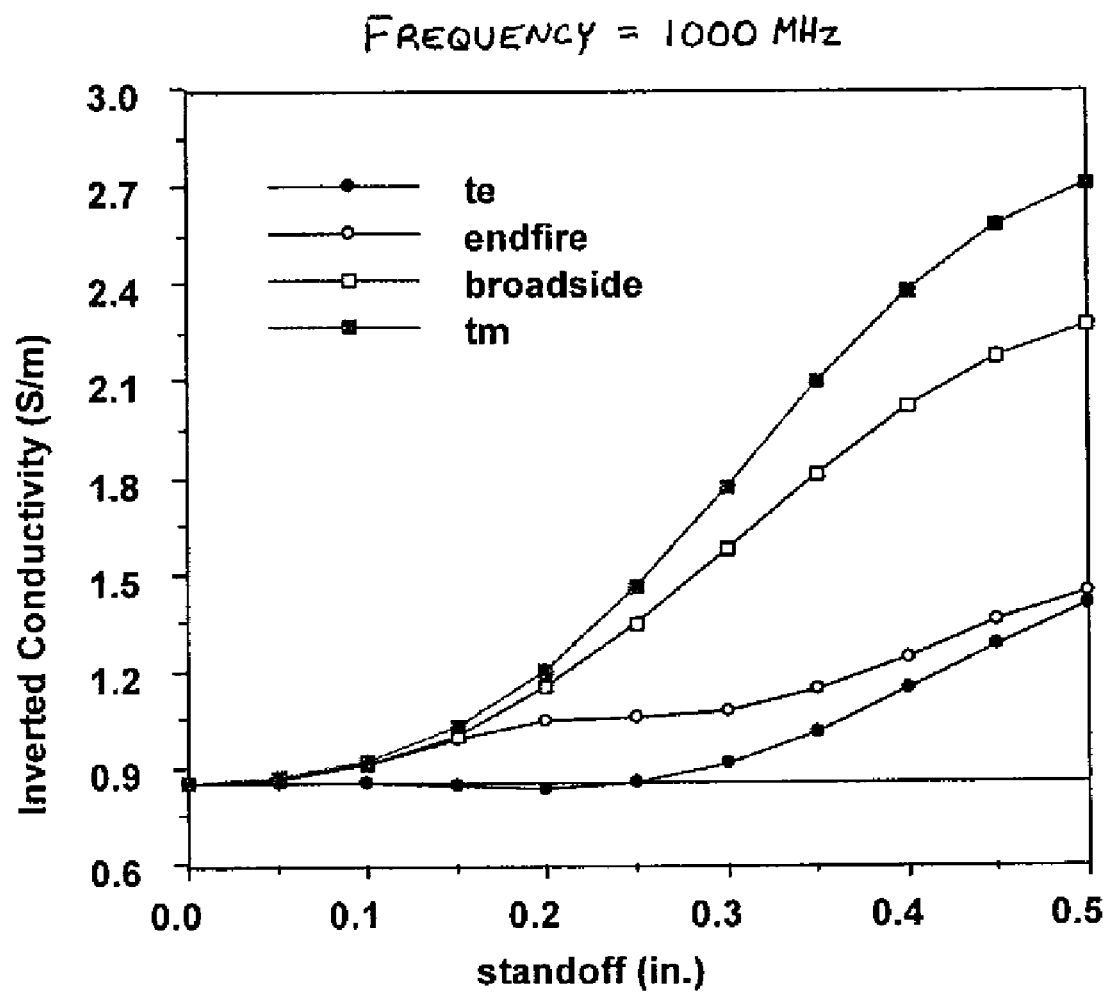
FIG. 12 is a graph plotting inverted conductivity versus standoff thickness for the TE, TM, EMD, and BMD arrays at a frequency of 1000 MHz.

FIG. 12 presents a graph that plots the inverted conductivity of each array versus standoff thickness at a frequency of 1000 MHz. Again, the synthesized TE array is improved over the EMD array, with the relative improvement being even larger than that for permittivity. The response of the synthesized TM array is again worse than that of the BMD array. The graph of FIG. 12 confirms that the synthesized TE array provides improved immunity to standoff over the conventional EMD array.

Figure 13:
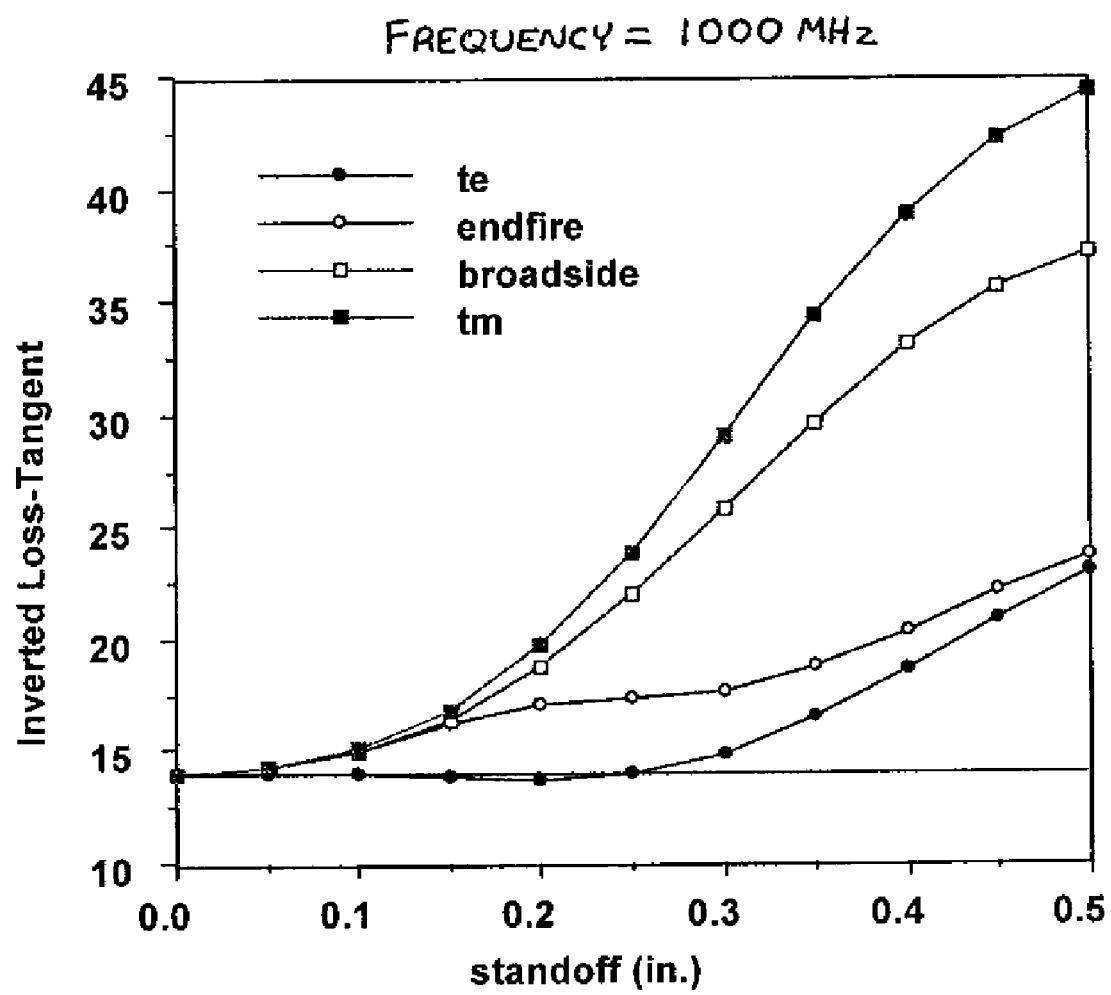
FIG. 13 is a graph plotting inverted loss-tangent versus standoff thickness for the TE, TM, EMD, and BMD arrays at a frequency of 1000 MHz.
Figure 14:
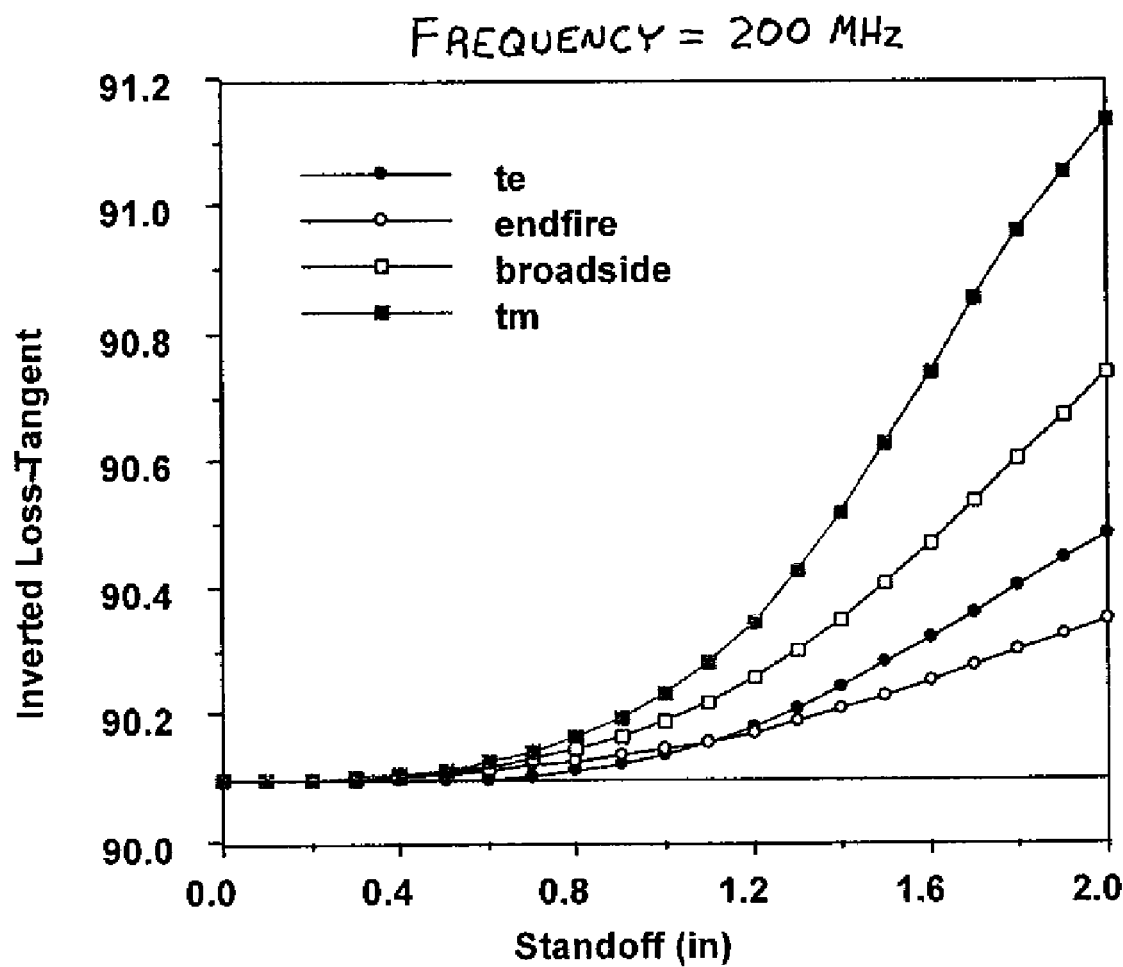
FIG. 14 is a graph plotting inverted loss-tangent versus standoff thickness for the TE, TM, EMD, and BMD arrays at a frequency of 200 MHz.

FIGS. 13 and 14 present graphs of the inverted loss tangent for each array at frequencies of 1000 and 200 MHz, respectively. The loss tangent is an alternative way of presenting the inverted data by combining the conductivity and the permittivity into a single variable. Loss tangent is defined as:

$$\tan\delta = \frac{\varepsilon''}{\varepsilon'} = \frac{\sigma}{\omega\varepsilon_0\varepsilon_r} \quad (20)$$

As seen from FIGS. 13 and 14, the response for each array is much less sensitive to the standoff layer. As before, however, the TE antenna response shows greater standoff immunity, particularly with standoff layer thicknesses of approximately 1 inch (2.54 cm) or less. The loss tangent plots again confirm the improved standoff response achieved by the synthesized TE array.

The above description shows that embodiments of the disclosure may be used in a logging tool like an EPT™ or ADEPT™ device. Embodiments of the disclosure may be used with wireline or logging-while-drilling (LWD), measurement-while-drilling (MWD), or logging-while-tripping (LWT) tools. A tool including antennas as disclosed herein may be operated at appropriate frequencies to achieve different types of measurements, i.e., induction and propagation measurements. Therefore, a tool according to the disclosure may be used in all kinds of mud, including water-based and oil-based mud. The tool may also provide borehole images in a well drilled with all types of mud.

When used on an LWD or MWD tool, an antenna array of the invention may be disposed in an articulating pad. Such articulating pads are known in the art, for example, the articulating pads on the PowerDrive™ tool available from Schlumberger Technology Corp. (Houston, Tex.). Alternatively, these arrays may be disposed on drill collars, pads extended from drill collars, or stabilizers of the LWD or MWD tools.

Those of ordinary skill in the art will appreciate that the present invention can be used with various antenna types such as magnetic dipole antennas (e.g., loop or coil antennas) and electric dipole antennas (e.g., toroids or electrodes). By "magnetic dipole antenna" we means an antenna that produces an electromagnetic field that is approximately the same as that produced by a theoretical magnetic dipole. Similarly, by "electric dipole antenna" we means an antenna that produces an electromagnetic field that is approximately the same as that produced by a theoretical electric dipole.

While only certain embodiments have been set forth, alternatives and modifications will be apparent from the above description to those skilled in the art. These and other alternatives are considered equivalents and within the scope of this disclosure and the appended claims.

What is claimed is:

1. A method to determine a formation property using a synthesized response of a desired antenna array, comprising:
   providing a first antenna array and a second antenna array;
   transmitting a first signal from a first antenna array transmitter;
   receiving the first signal at two or more spaced apart first antenna array receivers;
   combining the received signals from the spaced apart first antenna array receivers to produce a first antenna array direct response at a desired point and a first antenna array derivative response at the desired point;
   transmitting a second signal from a second antenna array transmitter;
   receiving the second signal at two or more spaced apart second antenna array receivers;
   combining the received signals from the spaced apart second antenna array receivers to produce a second antenna array direct response at the desired point and a second antenna array derivative response at the desired point;

synthesizing a response of the desired antenna array at the desired point using the direct responses and derivative responses of the first and second antenna arrays; and determining the formation property using the synthesized response.

2. The method of claim 1, wherein one or more of the antenna arrays is an endfire array, a broadside array, a tilted array, or a crossfire array.

3. The method of claim 1, wherein at least one antenna in at least one of the antenna arrays is an electric dipole antenna or a magnetic dipole antenna.

4. The method of claim 1, wherein the synthesizing uses the direct response from one of the arrays and the derivative response from the other array.

5. The method of claim 1, wherein the derivative responses are computed using a weighted difference quotient.

6. The method of claim 1, wherein the desired antenna array response is a transverse electric (TB) mode response, a transverse magnetic (TM) mode response, or a combination of TE and TM modes response.

7. The method of claim 1, wherein the desired antenna array is different from the first and second antenna arrays.

8. The method of claim 1, wherein the formation property includes one or more of resistivity, dielectric permittivity, magnetic permeability, image of a borehole wall, porosity, fluid saturation, fluid permeability, and bed boundary.

9. The method of claim 1, wherein the providing further comprises providing additional antenna arrays.

10. The method of claim 1, further comprising performing borehole compensation.

11. A logging tool to determine a formation property, comprising:
    a tool body;
    a first antenna array and a second antenna array carried on the tool body, the first and second antenna arrays each having at least one transmitter and two or more spaced apart receivers to provide received signals; and
    a processor to: combine the first antenna array received signals and the second antenna array received signals, produce first and second antenna array direct and derivative responses from the combined received signals, and synthesize a desired antenna array response from the direct and derivative responses that is used to determine the formation property.

12. The tool of claim 11, wherein one or more of the antenna arrays is an endfire array, a broadside array, a tilted array, or a crossfire array.

13. The tool of claim 11, wherein an antenna in the antenna arrays is an electric dipole antenna or a magnetic dipole antenna.

14. The tool of claim 11, wherein the first antenna array and the second antenna array comprise a total of five cross dipole antennas, wherein there is one cross dipole transmitter antenna and four cross dipole receiver antennas.

15. The tool of claim 11, wherein one or more of the antennas in the antenna arrays is a cross dipole antenna.

16. The tool of claim 11, wherein one or more of the antennas in the antenna arrays is a double cross dipole antenna.

17. The tool of claim 11, in which the tool is coupled to a wireline or a drill string.

18. The tool of claim 11, further comprising additional antenna arrays configured to perform borehole compensation.

19. The tool of claim 11, wherein the derivative response is computed using a weighted difference quotient.

20. A method to determine a formation property using a synthesized response of a desired antenna array, comprising:
    providing an antenna array;
    transmitting a signal from an antenna array transmitter;
    receiving the signal at two or more spaced apart antenna array receivers;
    combining the received signals from the spaced apart antenna array receivers to produce an antenna array direct response at a desired point and an antenna array derivative response at the desired point;
    synthesizing a response of the desired antenna array at the desired point using the direct response and derivative response of the antenna array; and
    determining the formation property using the synthesized response.

21. The method of claim 20, further comprising performing borehole compensation.

* * * * *